United States Patent
Malshe et al.

(10) Patent No.: US 11,971,263 B1
(45) Date of Patent: Apr. 30, 2024

(54) GEOGRAPHICAL UNIT GENERATION

(71) Applicant: Amazon Technologies, Inc., Seattle, WA (US)

(72) Inventors: Rohit Malshe, Bellevue, WA (US); Dipal Patel Gupta, Issaquah, WA (US); Liron David Yedidsion, Redmond, WA (US); Abhilasha Prakash Katariya, Issaquah, WA (US); Jin Ye, Kirkland, WA (US); Natarajan Gautam, College Station, TX (US)

(73) Assignee: Amazon Technologies, Inc., Seattle, WA (US)

( * ) Notice: Subject to any disclaimer, the term of this patent is extended or adjusted under 35 U.S.C. 154(b) by 382 days.

(21) Appl. No.: 16/990,825

(22) Filed: Aug. 11, 2020

(51) Int. Cl.
| | |
|---|---|
| *G01C 21/34* | (2006.01) |
| *G01C 21/20* | (2006.01) |
| *G06F 16/29* | (2019.01) |
| *G06F 16/9537* | (2019.01) |

(52) U.S. Cl.
CPC ......... *G01C 21/3446* (2013.01); *G01C 21/20* (2013.01); *G06F 16/29* (2019.01); *G06F 16/9537* (2019.01)

(58) Field of Classification Search
CPC ..... G01C 21/3446; G01C 21/20; G06F 16/29; G06F 16/9537
See application file for complete search history.

(56) References Cited

U.S. PATENT DOCUMENTS

| | | | |
|---|---|---|---|
| 10,467,562 B1* | 11/2019 | Mo | G06F 16/29 |
| 2006/0004797 A1* | 1/2006 | Riise | G06F 16/9537 |
| 2012/0310691 A1* | 12/2012 | Carlsson | G06Q 10/047 |
| | | | 705/7.13 |
| 2015/0242788 A1* | 8/2015 | Wu-Emmert | G06Q 10/06316 |
| | | | 705/7.26 |
| 2016/0140143 A1* | 5/2016 | Anklam | G06F 16/29 |
| | | | 707/756 |
| 2017/0074662 A1* | 3/2017 | Castellucci | G01C 21/20 |
| 2020/0082318 A1* | 3/2020 | Liu | G06Q 10/08 |
| 2020/0264619 A1* | 8/2020 | Joseph | G08G 1/0129 |
| 2020/0349511 A1* | 11/2020 | Seaver | G06Q 10/06315 |

* cited by examiner

*Primary Examiner* — Geepy Pe
*Assistant Examiner* — Paulo Roberto Gonzalez Leite
(74) *Attorney, Agent, or Firm* — Kilpatrick Townsend & Stockton LLP

(57) ABSTRACT

Techniques for generating geographical units that can be used to generate delivery routes are described herein. Geospatial vector data and barrier geospatial vector data for a geographical area may be obtained. Seed points for one or more portions of the geographical area may be determined based at least in part on historical delivery volume for the geographical area. A plurality of polygons that represent the geographical area may be determined based at least in part on an algorithm that uses the seed points, the geospatial vector data, and the barrier geospatial vector data. Coordinates for a geographical unit of a plurality of geographical units that divide the geographical area may be determined based at least in part on the plurality of polygons and a polygon-to-polygon barrier aware drive time matrix that identifies a calculated cost for traveling from one polygon to another polygon using barriers identified in the barrier geospatial vector data.

20 Claims, 13 Drawing Sheets

GEOGRAPHICAL UNIT GENERATION

BACKGROUND

Some merchants and e-commerce organizations offer delivery of their goods to a consumer's residence as a service. In the same way, delivery companies such as food delivery, ad hoc restaurant to customer deliveries and dedicated pizza delivery companies employ similar last mile operations where they serve the customers from various delivery points. As cities and towns grow larger and population density increases, it becomes more difficult to generate efficient delivery routes for the goods. For example, conventional route planning engines which develop routes for delivery vehicles to deliver the packages to consumer's residencies may generate delivery routes that are too long (e.g., cross heavy traffic areas multiples times in the same route) or are unbalanced and inconsistent. In addition, it is difficult to divide a work force into logical geographical blocks to maintain high geographical familiarity for delivery drivers. Conventional route planning engines may use conventional jurisdiction division techniques to determine which routes are applicable to which areas and thus generate flawed delivery routes. Moreover, conventional jurisdiction division techniques for a delivery area are generated inefficiently as many techniques involve manual drafting of the areas which fail to account for delivery road networks and barriers.

BRIEF DESCRIPTION OF THE DRAWINGS

Various embodiments in accordance with the present disclosure will be described with reference to the drawings, in which.

DETAILED DESCRIPTION

Figure 1:
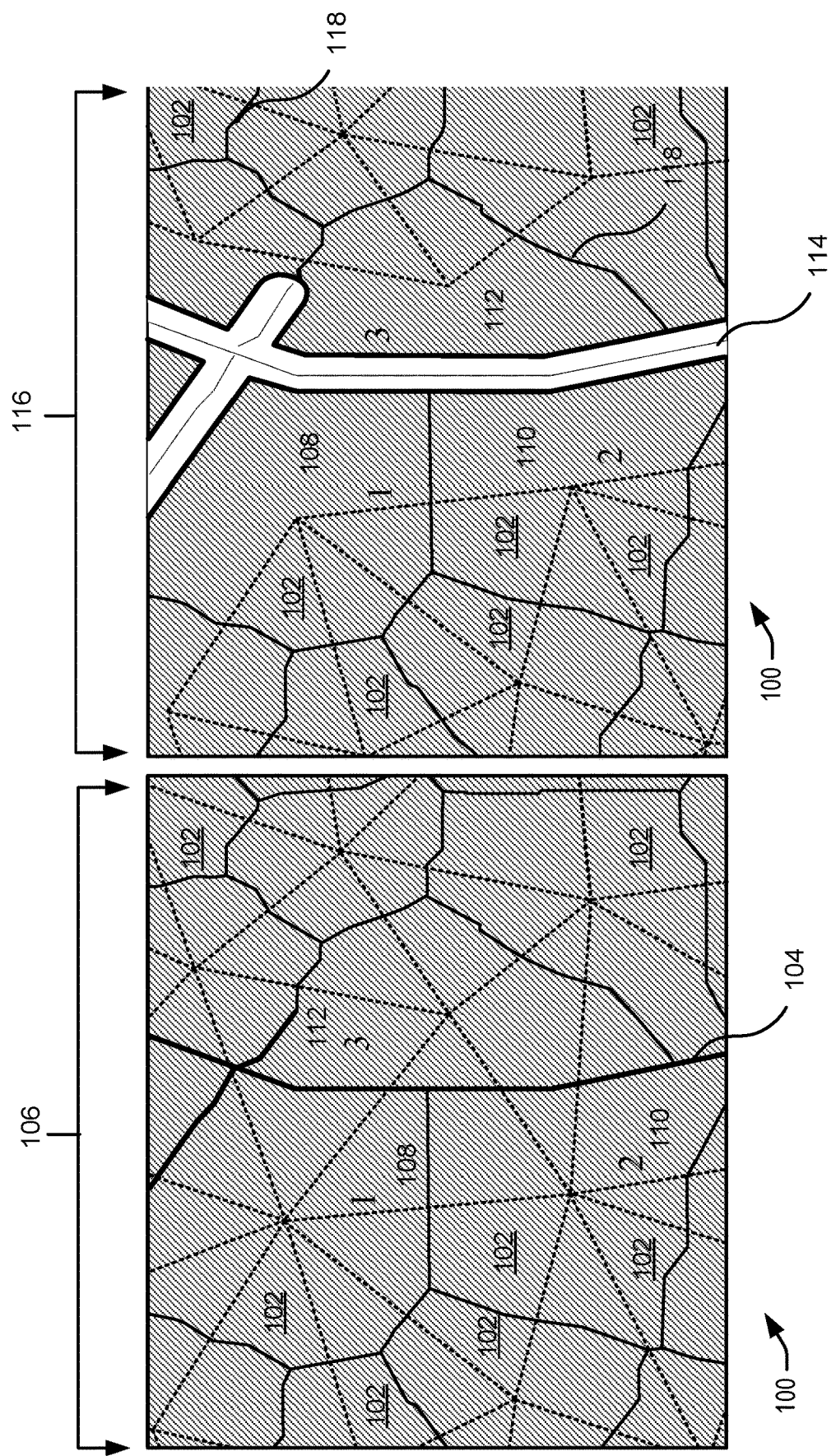
FIG. 1 illustrates an example area divided into barrier aware polygons in accordance with the geographical unit generation feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a geographical unit generation feature for generating geographical units which divide a geographical area. The geographical units may be used to generate efficient and consistent delivery routes for the geographical area and also to divide the work force into manageable sub-groups. In embodiments, a service provider computer implementing the geographical unit generation feature may be configured to utilize one or more of several different types of algorithms (e.g., k-means clustering algorithm, raster-based cost allocation algorithm, and/or a Floyd-Warshall algorithm), historical delivery volume data, and average delivery volume data to generate geographical units that divide a geographical area. An example of a geographical unit is a set of geographical coordinates that define a boundary for a sector or portion of a geographical area. A portion of a geographical area may be uniquely assigned to each geographical unit of the set of geographical units. An example of a seed point is a geographic location within a certain area of the geographical area that represents a cluster and/or density of delivery locations or delivery volume. In embodiments, the seed point may include an arithmetic mean of delivery locations or delivery volume. In embodiments, a geographical area may include an area that is defined using units of geography such as a standardized unit of geography represented in a ZIP code, a postal code, neighborhoods, census tracts, or ZIP code tabulation areas.

In embodiments, the geographical unit generation feature can assign generated barrier aware polygons that represent portions of the geographical area to specific geographical units that optimize (e.g., maximize) inter-sector differences and intra-sector similarities. Inter-sector differences may refer to establishing a clear division between the geographical units from one another. Intra-sector similarities may refer to a grouping of barrier aware polygons such that every possible delivery location in the geographic unit is closer to other potential delivery locations in the geographical unit than delivery locations in other geographical units while being aware of barriers which would increase travel and delivery time to certain delivery locations. An example of barrier aware polygons includes a process for partitioning of a plane (geographical area) with n seed points into convex polygons such that each polygon contains exactly one seed point and every point in a given polygon is closer to its seed point than to any other seed point. In embodiments, a barrier aware polygon may include a bounded Voronoi polygon. A bounded Voronoi polygon is a polygon that does not cross barrier or constraints. A method for producing barrier aware polygons includes a process for partitioning the geographic area into many polygons. This process utilizes a raster-based cost allocation algorithm to calculate a relatively high cost to boundaries during a polygon curation process where we have physical barriers. This helps in dividing the geography into smaller polygons which are bounded by barriers and respect road networks, lakes, parks, etc.

The geographical unit generation feature may utilize historical delivery volume data and average delivery volume data to divide a geographical area into geographical units. Historical delivery volume data may be referred to as historical volume data and can include data corresponding to package deliveries to a geographical area or location, population density for a geographical area, mobile phone usage for a geographical area, cell phone tower ping data for the geographical area, website login information for the geographical area, or any suitable information that can be used to derive density of an area that can be used to divide the area into geographical units. Input from entities such as administrators or other entities may define certain constraints or parameters for use in the algorithm or assignment engine that assigns that barrier aware polygons to each geographical unit. For example, parameters or constraints may indicate that geographic units must include contiguous areas covering the entirety of the geographical area without gaps, each geographic unit should account for a minimum and maximum average daily delivery volume, or the number of geographic units that may comprise the geographic area. In embodiments, the geographical unit generation feature may be used to redraw or update the geographic units assigned to a geographic area based at least in part on an addition or deletion of delivery service provider for the geographic area, a new split or share of the geographic area among current delivery service providers, a change to a jurisdiction for a delivery station of a geographic area, or based at least in part on updated load of volume for certain portions of the geographic area. In a non-limiting example, the service provider computer implementing the geographical unit generation feature may obtain geospatial vector data and barrier geospatial vector data for a geographic area. The service provider computer may determine seed points for one or more portions of the geographical area based at least in part on historical delivery volume data for the geographical area.

The service provider computer may implement a raster-based cost allocation algorithm to determine a plurality of barrier aware polygons where each polygon is associated with a seed point. A polygon-to-polygon barrier aware drive time matrix may be generated based at least in part on an algorithm that identifies a cost for traveling from one polygon to another polygon given the constraint of a barrier. The coordinates which define and divide the geographical area into a plurality of geographical unit may be determined based at least in part on the plurality of polygons and the polygon-to-polygon barrier aware drive time matrix. For example, a geographical area of three contiguous ZIP codes included in a jurisdiction for a delivery station may be divided into nine geographical units which meet the constraints and parameters for the algorithm that assigns the polygons to the geographical units. In embodiments, the nine geographical units may be used to generate a plurality of delivery routes to deliver items to delivery locations located within the geographical areas. These delivery routes may be optimized (e.g., reduce overall trip length to complete a task of delivering an item) based at least in part on the coordinates for each geographical units. For example, delivery routes may be generated such that a delivery entity avoids crossing from one geographical unit into another geographical unit while being aware of barriers such as rivers, lakes, major highways, or even minor roads. As generated delivery routes may be limited to a specific geographical unit delivery entities may build familiarity with the routes and geographical unit to further increase efficiency during delivery of an item. Delivery associates of delivery entities may deliver packages or items to delivery locations using any number of transportation modes not limited to vehicles, unmanned drones, in-person, etc.

In accordance with at least one embodiment, the geographical area and the barrier geospatial vector data may be represented and maintained as a Shapefile. The service provider computers implementing the geographical unit generation feature may access, modify, and maintain one or more Shapefiles during assignment of barrier aware polygons to geographical units. A Shapefile may include a nontopological format for storing geometric location and attribute information of geographic features and may be represented as points, lines or polygons. The geographical area, barriers for the geographical area, and the barrier aware polygons generated by the service provider computers may include geospatial vector data usable in a geospatial vector data format by a computer system. In embodiments, the barrier geospatial vector data may include geospatial vector data that identifies barriers represented as shapes for highways, rivers, lakes, mountains, or other suitable obstacles or barriers for a geographical area. The processes and systems described herein may be an improvement on conventional geographical area division techniques which are used in route generation and planning for delivery of packages to a geographical area. For example, conventional geographical area division techniques may utilize manually drawn polygons which can be time intensive and rely on intimate knowledge of the geographical area. Many times, such techniques require a delivery company to send an enormous amount of work force on the road to achieve this. Moreover, conventional techniques do not account properly for barriers located in the geographic area. As such, the geographical units that divide a geographical area using conventional techniques lead to areas which may not be covered and generation of non-optimized delivery routes which may cross boundaries between geographical units and barriers. Non-optimized delivery routes may be unbalanced thereby creating even more inefficient delivery of packages as one delivery associate may be overwhelmed while another delivery associate is underutilized. Delivery associates may be unable to build up familiarity or affinity with a particular geographic unit generated using conventional geographical unit generation techniques. Delivery drivers may have to cross highways through circuitous paths thereby spending an excessive amount of drive time on the road.

The geographic unit generation feature implemented by the systems described herein results in increased delivery associate familiarity with a geographic unit in a geographic area as well as cost savings for the equipment associated with the delivery associate and distribution centers as the delivery associates drive less miles while accomplishing a more balanced and efficient delivery route. Attrition of delivery associates can be lowered by increasing familiarity with a geographic unit as delivery routes generated from inefficient, unbalanced, or incorrect geographic unit division results in delivery routes which cross boundaries of different geographic units and barriers. Increased familiarity with a geographic unit delivery routes within the geographic unit can also provide more efficiency in route delivery as delivery associates are better able to navigate road networks and geographical obstructions and dynamically generate slight alterations to a route to account for unforeseen variables such as traffic accidents or power outages within the geographical unit. The package load balancing among delivery routes generated for a geographical unit can also reduce attrition of delivery associates and provide increased delivery times for packages within a geographical unit as one delivery associate is not overwhelmed while another delivery associate is underutilized. The features described herein may also provide dynamic route planning solutions as the delivery routes can be updated by redesigning the geographical units for a geographical area based at least in part on updated delivery route data, delivery volume or density data, and other information instead of being tied to a predefined distribution center that could result in more inefficient delivery. Computer systems implementing the geographical unit generation features described herein may utilize less resources as geographical units that divide a geographical area and delivery routes created for the geographical units are generated infrequently using historical information. This can reduce variability in delivery routes whereas current conventional systems may utilize more resources by redesigning delivery routes for a geographical area each day attempting to account for a larger amount of variables thereby generating inefficient routes.

FIG. 1 illustrates an example area divided into barrier aware polygons in accordance with the geographical unit generation feature, in accordance with at least one embodiment. In accordance with at least one embodiment, the geographical unit generation feature utilizes barrier aware polygons that represent a geographical area to assign the polygons to a geographic unit. Conventional geographic unit division techniques for a geographical area may not account for barriers, may not work with complex polygons, and therefore fail to generate optimized geographical units for a geographical area. In embodiments, the service provider computers implementing the geographical unit generation feature may utilized bounded Voronoi polygons (barrier aware polygons) that represent a geographical area. Generating the barrier aware polygons may be performed during a polygon curation process and geographical unit assignment process. FIG. 1 illustrates an example geographical area 100 represented by a plurality of bounded Voronoi polygons 102. The geographical unit generation feature described herein generates bounded Voronoi polygons 102 to represent a geographical area to account for complex shapes based at least in part on the seed points for each potential polygon as well as generate some polygons that are split across barriers. For example, FIG. 1 depicts a barrier 104 that represents a major highway for geographical area 100.

As illustrated prior to modifying the geospatial vector data for the geographical area 100 represented as 106, certain polygons are considered adjacent even they are on opposite sides of a barrier. For example, in 106, polygons 108, 110, and 112, represented as "1," "2," and "3," respectively, are considered adjacent neighbors despite the fact that the barrier 104 is between polygons 108 and 112 as well as polygons 110 and 112. However, when generating the barrier aware polygon-to-polygon drive time matrix two polygons split by a barrier should be considered non-adjacent. To account for this, the service provider computers may generate a temporary copy of the polygons that are on opposite sides of the barrier (108-112) by generating a temporary Shapefile. The temporary copy of the polygons 108-112 may include an area 114 that cuts out the barrier line-strings and provides a small buffer around the barrier 104.

As illustrated in FIG. 1, the modified geospatial vector data for the geographical area represented as 116 includes an area 114 that serves as a buffer around the barrier 104. This creates an artificial space between polygons that fall on opposite sides of the barrier 104. As illustrated in FIG. 1, the representation 116 of geographical area 100 with the modified geospatial vector data results in polygons 108 and 110 remaining adjacent neighbors whereas polygons 108 and 112 as well as polygons 110 and 112 are no longer considered adjacent neighbors as they are on opposite sides of the barrier 104 as represented by the area 114 that serves as a buffer. In embodiments, the set or plurality of polygons 102, 108-112 for geographical area 100 are used for assigning the polygons 102, 108-112 to specific geographical units for the geographical area 100 as described in more detail below. However, when generating the barrier aware polygon-to-polygon drive time matrix the temporary copy or buffer including representation 106 of the polygons 102, 108-112 is utilized. In embodiments, more or less barriers can be specified which would result in generation of more buffers around barriers for the geographical area 100. For example, minor highways 118 or roads may be specified as barriers according to input provided by an entity such as an administrator associated with the service provider computers.

Figure 2:
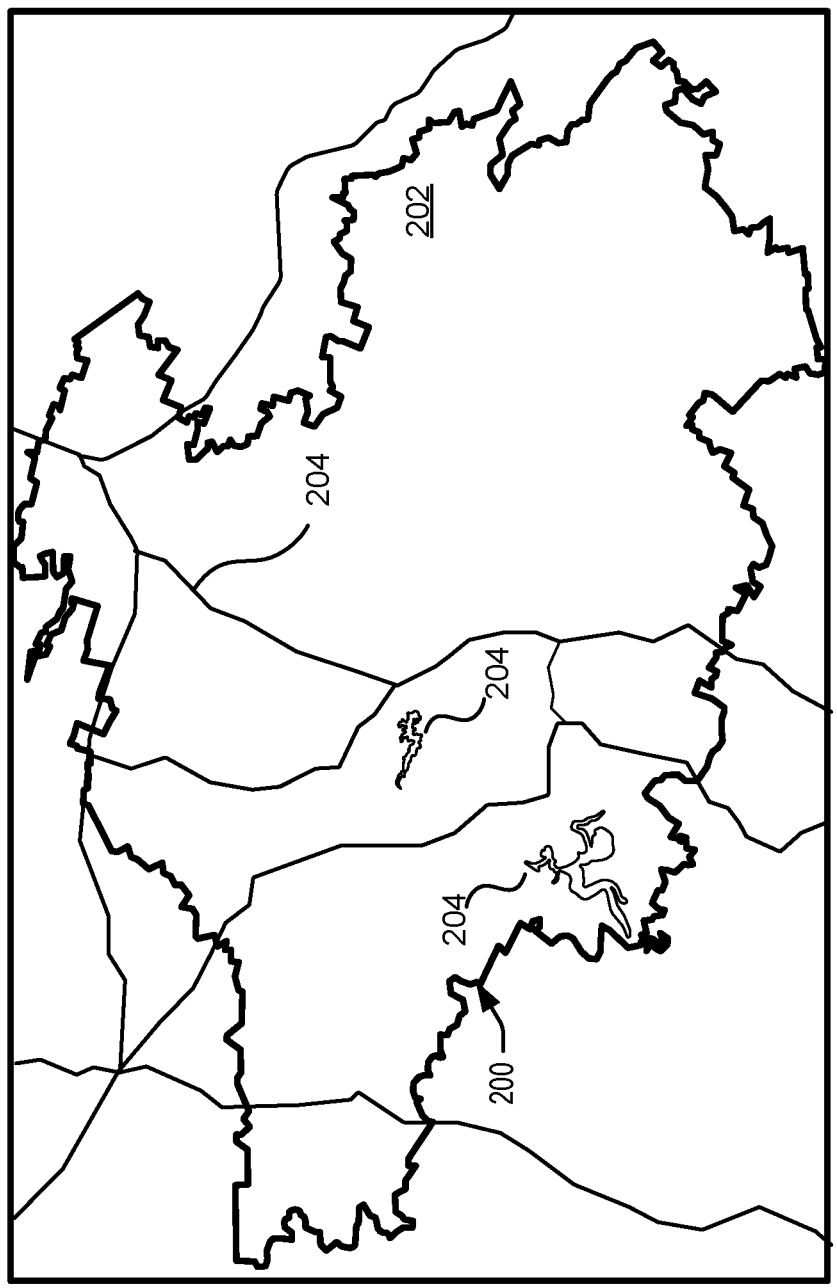
FIG. 2 illustrates an example delivery area for dividing into geographical units using the geographical unit generation feature, in accordance with at least one embodiment.

FIG. 2 illustrates an example delivery area for dividing into geographical units using the geographical unit generation feature, in accordance with at least one embodiment. FIG. 2 depicts boundaries 200 for a geographical area 202 that may require division into geographic units as described herein. In embodiments, the geographical area 202 may include a jurisdiction for a delivery station or multiple delivery stations. The depiction of geographical area 202 includes one or more barriers 204 including highways, lakes, and parks. The geographical area 202 may be represented as a complex polygon that includes multiple delivery locations for delivering items or packages to consumers. In accordance with at least one embodiment, geographical units that divide the geographical area 202 may be required based at least in part on an update to a size or boundaries 200 of the geographical area 202, the addition or deletion of a delivery service provider associated with the geographical area, or based at least in part on an updated delivery volume data for the geographical area that corresponds to packages or items delivered to delivery locations within the geographical area 202.

In embodiments, historical delivery volume data for the geographical area may be obtained by the service provider computers implementing the geographical unit generation feature or third parties that desire to generate delivery routes for delivering items within the geographical area 202 based at least in part on generated geographical units. The geographical area may be referred to as a military grid reference system and the historical delivery volume data may be based at least in part on the volume of delivery packages historically delivered within the military grid reference system that encompasses the geographical area 202. For example, the size of the geographical area 202 may be as little as a 1 meter block up to 1000 meter blocks. Typical historical volume data is obtained from a 100 meter block of the military grid reference system that encompasses the geographical area 202. The jurisdiction or geographical area 202 for the delivery station (not pictured) may be stored or maintained in a Shapefile that is obtained by the service provider computers implementing the geographical unit generation feature. As described herein, the barriers 204 may include lakes, rivers, parks, mountains, highways (major or minor) or other suitable obstacles to delivery routes. Administrators of the service provider computers may specify parameters which result in more objects being considered barriers or less objects being considered barriers. For example, data may be set which corresponds to a parameter that indicates that minor highways should also be considered barriers. As described in further detail below with reference to FIGS. 7A-7C, the update to what is considered a border can result in more or less geographical units for a geographical area as well as the size and shape of the geographical units for the geographical area.

Figure 3:
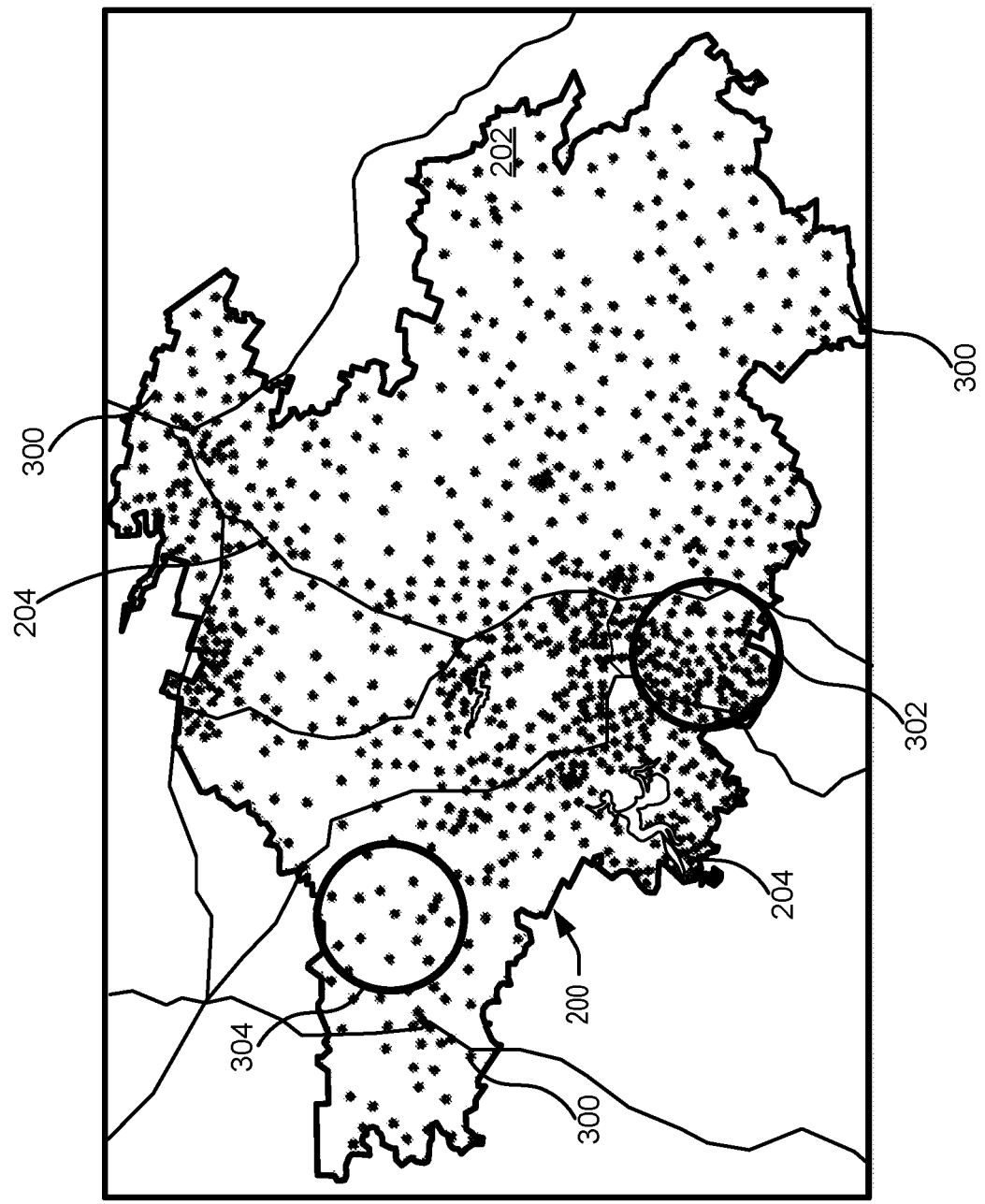
FIG. 3 illustrates a plurality of seed points for generating polygons for a delivery area using the geographical unit generation feature, in accordance with at least one embodiment.

FIG. 3 illustrates a plurality of seed points for generating polygons for a delivery area using the geographical unit generation feature, in accordance with at least one embodiment. FIG. 3 depicts the same geographical area 202 with boundaries 200 and barriers 204 as well as assignment of seed points 300 to portions of the geographical area 202 depicted in FIGS. 1 and 2 using the geographical unit generation feature. In accordance with at least one embodiment, the service provider computers use a weighted k-means clustering algorithm on the historical delivery volume data to identify the seed points 300 for generating a Voronoi diagram made of a plurality of bounded Voronoi polygons. As depicted in FIG. 3, certain portions 302 contain more seed points 300 than other portions 304. For example, the portion 302 of geographical area 202 may correspond to a downtown area of a city that is densely populated whereas portion 304 of the geographical area 202 may correspond to rural area that is less densely populated.

In embodiments, the service provider computers implementing the geographical unit generation feature may utilize a k-means clustering algorithm or any suitable algorithm that clusters similar objects into clusters while maintaining that each cluster is distinct from other clusters. In accordance with at least one embodiment, the seed points 300 may be specified for the geographical area 202 instead of being determined based at least in part on the historical delivery volume data for the geographical area. The time period from which to draw the historical delivery volume data may be specified by an administrator of the service provider computers thereby changing the location and number of seed points. Certain parameters may be specified to generate a minimum and/or maximum number of seed points for the geographical area 202. In embodiments, the geographical unit generation feature will generate a bounded Voronoi which is a barrier aware polygon for each seed point 300 for geographical area 202.

Figure 4:
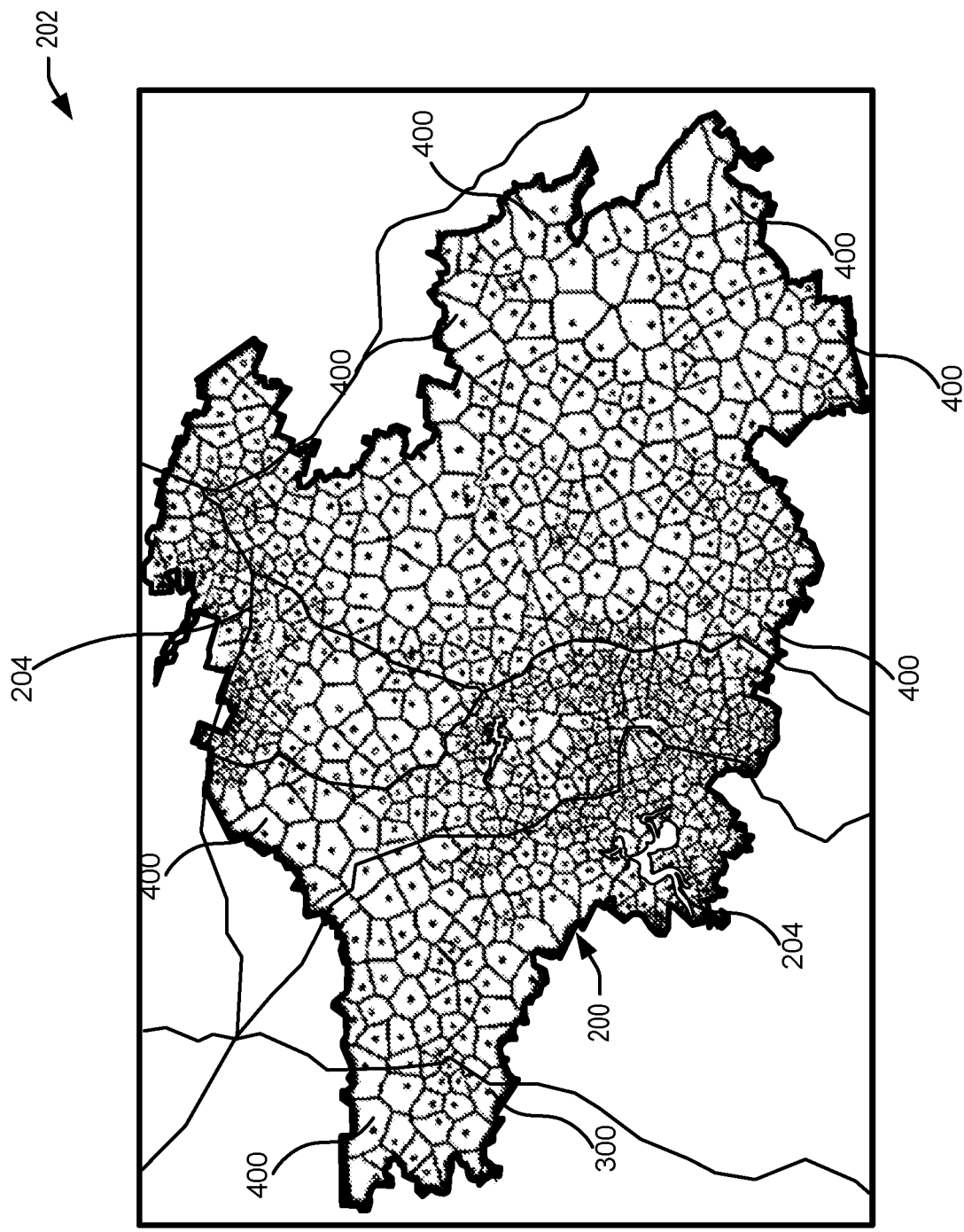
FIG. 4 illustrates a plurality of barrier aware polygons for the delivery area based at least in part on a plurality of seed points using the geographical unit generation feature, in accordance with at least one embodiment.

FIG. 4 illustrates a plurality of barrier aware polygons (bounded Voronoi polygons) 400 for the delivery area based at least in part on a plurality of seed points using the geographical unit generation feature, in accordance with at least one embodiment. FIG. 4 illustrates the same geographical area 202 with boundaries 200, barriers 204, and seed points 300 of FIGS. 1-3. In embodiments, the barrier aware polygons 400 may be bounded Voronoi polygons. The barrier aware polygons 400 have edges that do not cross barriers 204 but still include the barrier 204 areas with a set of shapes included in one or more barrier aware polygons 400 as depicted in more detail in FIG. 5. To generate the barrier aware polygons 400 the service provider computers implementing the geographical unit generation feature may utilize a raster-based cost allocation algorithm to produce bounded Voronoi polygons. Using the seed points 300, the raster-based cost allocation algorithm generates a raster cost map of the geographical area 202 in which pixels that contain a barrier, such as barrier 204, have a cost of 1000 and all other pixels have a cost of 1. Note that the costs can be tuned to different values by type of barrier by a user for example to give the notion of soft barriers versus hard barriers. The raster-based cost allocation algorithm then divides the geographic area 202 to the nearest seed point 300 using the raster cost map. The raster-based cost allocation algorithm calculates, for each cell in a raster cost map, a least-cost source seed point based at least in part on the least cumulative cost over a cost surface. In tables 1-4 below A and B are seed points, and the cost to traverse each pixel in the raster cost map is defined in the cost raster. Given the two inputs of seed points A and B, the raster-based cost allocation algorithm would determine the least cost to and from each cell to the nearest seed point (A or B), displayed in least cumulative cost, and allocate each cell to the nearest seed point as displayed in cost allocation.

TABLE 1 seed points

| A | | | | | | | | | |
|---|---|---|---|---|---|---|---|---|---|
|   |   |   |   | B |   |   |   |   |   |

TABLE 2 cost raster

| 1 | 1 | 1 | 1 | 1 | 1 | 1 | 1 | 1 | 1 |
|---|---|---|---|---|---|---|---|---|---|
| 1 | 1 | 1 | 1 | 1 | 1 | 1 | 1 | 1 | 1 |
| 1 | 1 | 1 | 1 | 1 | 1 | 1000 | 1000 | 1000 | 1000 |
| 1 | 1 | 1 | 1 | 1 | 1000 | 1000 | 1 | 1 | 1 |
| 1 | 1 | 1000 | 1000 | 1000 | 1 | 1 | 1 | 1 | 1 |
| 1 | 1000 | 1000 | 1 | 1 | 1 | 1 | 1 | 1 | 1 |
| 1000 | 1000 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

TABLE 3 least cumulative cost

| 2 | 1 | 0 | 1 | 2 | 3 | 4 | 5 | 6 | 7 |
|---|---|---|---|---|---|---|---|---|---|
| 2 | 1 | 1 | 1 | 2 | 3 | 4 | 5 | 6 | 7 |
| 2 | 2 | 2 | 2 | 2 | 3 | 4 | 5 | 6 | 7 |
| 2 | 2 | 2 | 2 | 2 | 3 | 1004 | 1004 | 1004 | 1004 |
| 3 | 3 | 3 | 3 | 3 | 1003 | 1003 | 4 | 4 | 4 |
| 4 | 4 | 4 | 1003 | 1002 | 1002 | 3 | 3 | 3 | 3 |
| 5 | 5 | 1004 | 1003 | 2 | 2 | 2 | 2 | 2 | 3 |
| 5 | 1005 | 1004 | 3 | 2 | 1 | 1 | 1 | 2 | 3 |
| 1005 | 1005 | 4 | 3 | 2 | 1 | 0 | 1 | 2 | 3 |
| 6 | 5 | 4 | 3 | 2 | 1 | 1 | 1 | 2 | 3 |
| 6 | 5 | 4 | 3 | 2 | 2 | 2 | 2 | 2 | 3 |

TABLE 4 cost allocation

| A | A | A | A | A | A | A | A | A | A |
|---|---|---|---|---|---|---|---|---|---|
| A | A | A | A | A | A | A | A | A | A |
| A | A | A | A | A | A | A | B | B | B |
| A | A | A | A | A | A | B | B | B | B |
| A | A | A | A | B | B | B | B | B | B |
| A | A | A | B | B | B | B | B | B | B |
| A | A | B | B | B | B | B | B | B | B |
| A | B | B | B | B | B | B | B | B | B |

TABLE 4-continued cost allocation

| B | B | B | B | B | B | B | B | B | B |
|---|---|---|---|---|---|---|---|---|---|
| B | B | B | B | B | B | B | B | B | B |

The service provider computers may then, using the raster-based cost allocation algorithm, convert the cost allocation raster to vectorized polygons or barrier aware polygons 400. The raster-based cost allocation algorithm generates the barrier aware polygons 400 which can be of complex shape and account for complex barriers 204, both linear and polygon barriers, and allows barriers 204 as inputs that require very little cleaning within a resultant Shapefile. The pixels of the raster cost map that correspond to barriers 204 may be appropriately covered by the barrier aware polygons 400 such that the plurality of barrier aware polygons 400 is a smooth surface that covers the entirety of the geographic area 202 with no holes or gaps. As described with reference to FIG. 1, generating the cost surface raster may include cutting out barrier polygons that correspond to barriers 204 and converting the resulting polygon for the geographical area 202 into the cost raster.

Figure 5:
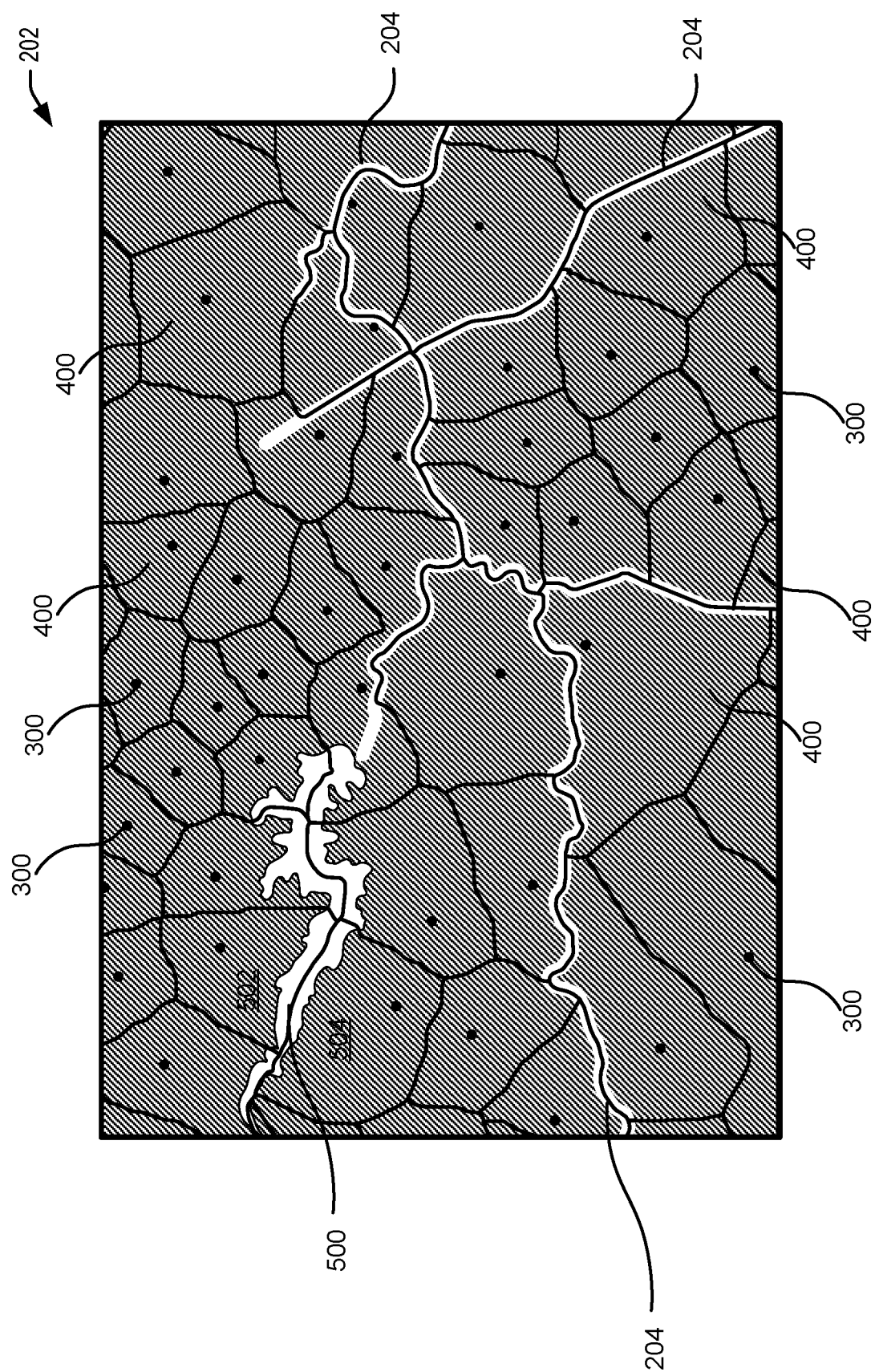
FIG. 5 illustrates an example of barrier aware Voronoi polygons generated using the geographical unit generation feature, in accordance with at least one embodiment.

FIG. 5 illustrates zoomed in view of barrier aware polygons 400 generated using the geographical unit generation feature, in accordance with at least one embodiment. As described above with reference to FIG. 4, the barrier aware polygons 400 may split a barrier 500, such as a lake, along the barrier's 500 centerline. However, the barrier aware polygons 400 do not cross the barrier 204 itself. For example, as depicted in FIG. 5, particular barrier aware polygons 502 and 504 split the barrier 204 along the centerline. In embodiments, the barrier aware polygons may treat linear barriers 204 such as highways and rivers similarly (as shown in FIG. 1 above). As FIG. 5 depicts a zoomed in view of barrier aware polygons 400 it also depicts geographic area 202, barriers 204, seed points 300, and barrier aware polygons 400. The barrier 500 may be an example of barriers 204 from FIGS. 2-4. In accordance with at least one embodiment, the service provider computers implementing the geographical unit generation feature may clean up the barrier aware polygons 400 by converting back from the raster to vector format and using suitable vector tools to smooth out lines and identify as well as fix invalid geometries present in the barrier aware polygons 400. Invalid geometries include self-interactions, sliver polygons, or overlaps between barrier aware polygons 400.

Figure 6:
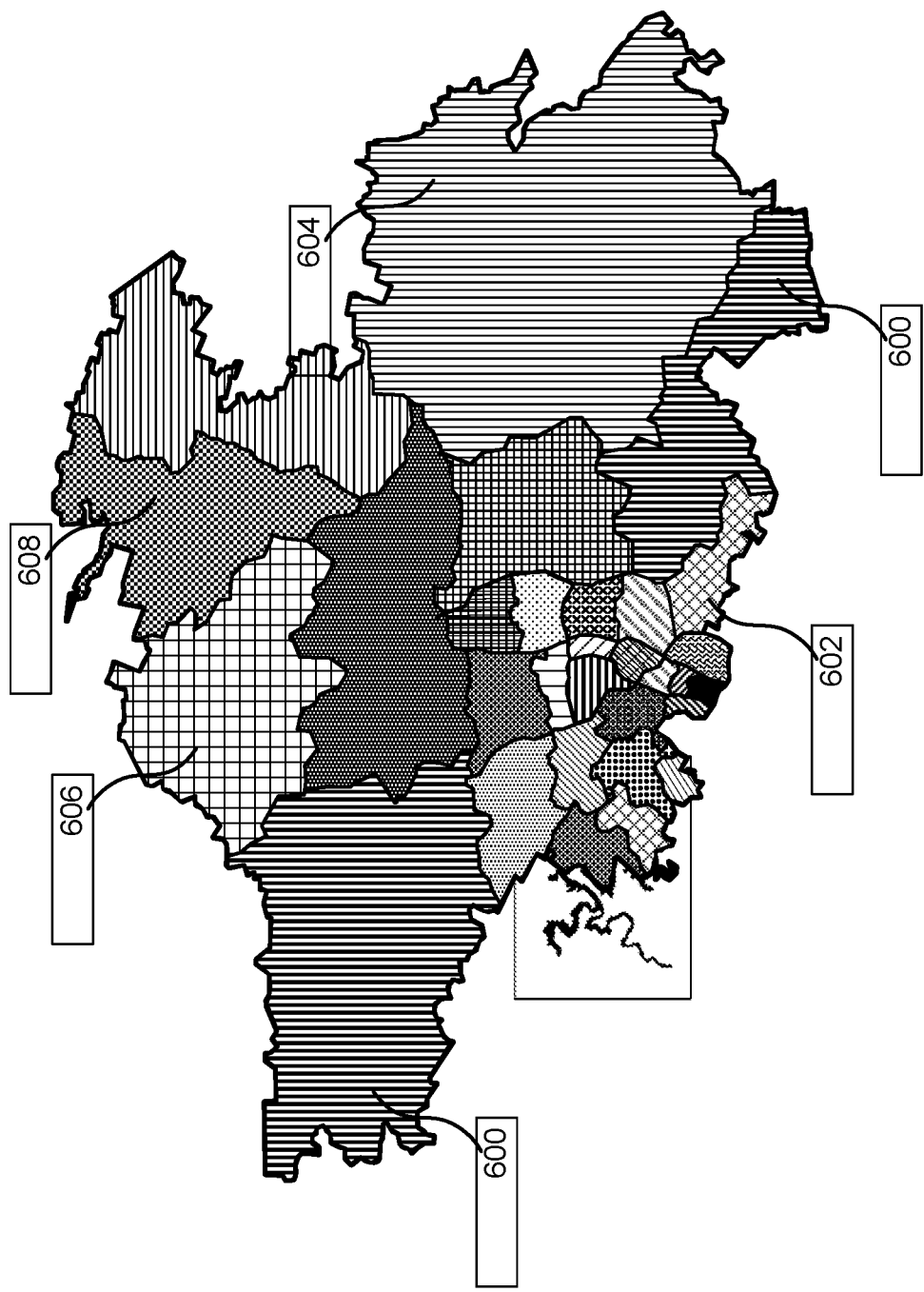
FIG. 6 illustrates an example of geographical units assigned to a geographical area using the geographical unit generation feature, in accordance with at least one embodiment.

FIG. 6 illustrates an example of geographical units assigned to a geographical area using the geographical unit generation feature, in accordance with at least one embodiment. FIG. 6 depicts geographical units 600-608 assigned to geographical area 202 using the geographical unit generation feature described herein. The service provider computers implementing the geographical unit generation feature may sum up the historical delivery volume for each barrier aware polygon 400 and assign an average daily delivery volume to each barrier aware polygon 400 proportional to the summed historical delivery volume in each barrier aware polygon 400. The geographical unit generation feature includes using the average daily delivery volume to generate a barrier aware adjacency matrix (described above with reference to FIG. 1) and a barrier aware drive time matrix. In embodiments, the service provider computers may implement a geographical unit assignment engine to generate the geographical units 600-608 that are assigned to the geographical area 202.

In embodiments, generating the polygon-to-polygon drive time matrix includes using a population weighted centroid for each barrier aware polygon 400 that snaps each centroid to the nearest road. The road snapped centroids may be used by service provider computers to build a polygon-to-polygon drive time matrix. The barrier aware polygon-to-polygon drive time matrix modifies the previously generated polygon-to-polygon drive time matrix to penalize crossing a barrier to connect two polygons during geographical unit assignment to the geographical area 202. The service provider computers may implement a process that includes building a dense graph with each polygon 400 of the barrier aware polygons 400 being a node in the graph. The weights of the edge connecting each graph may be defined by: nodes that are adjacent and do not have a barrier (204) separating them may correspond to actual drive time to connect two polygons 400; nodes that are adjacent and have a barrier 204 separating them correspond to actual drive time to connect two polygons 400 plus a penalty (e.g., 100,000); nodes that are not adjacent may correspond to actual drive time plus a large penalty (e.g., one million). The service provider computers may implement a Floyd-Warshall algorithm to find the shortest path between each pair of nodes in the graph generated from the barrier aware polygons 400. This results in a modified drive time matrix (barrier aware polygon-to-polygon drive time matrix) where a source node follows the least cost path of adjacent nodes to reach the target node. If the only way to travel between a pair of nodes is through a barrier 204, then the drive time will be heavily penalized for this pair. By using the Floyd-Warshall algorithm, the barrier aware polygon-to-polygon drive time matrix resembles the actual distance of the shortest path with respect to barriers 204 between barrier aware polygons 400.

The geographical unit assignment engine implemented by the service provider computers minimizes the drive time from the source nodes of each geographical unit 600-608 to the barrier aware polygons 400 assigned to the geographical units 600-608. By utilizing the geographical unit assignment engine the resultant geographical units 600-608 are compact for geographical area 202. The generated geographical units 600-608 will avoid crossing barriers of other geographical units 600-608 unless needed to meet a minimum delivery volume requirement that can be specified by an administrator or other entity. The geographical unit assignment engine increases the likelihood that the generated geographical units 600-608 are contiguous regions. The geographical unit assignment engine may penalize an objective function by a parameter $penalty_{newGU}$ for each geographical unit (GU) that is created. This parameter can be tuned to balance between subdividing the geographical area 202 into many geographical units 600-608 and minimizing the number of times barriers 204 are crossed, and allowing barriers 204 to be crossed more often to create larger and a fewer number of geographical units 600-608. The geographical unit assignment engine may utilize the following model formulation: Set C defines polygons to be assigned to a GU. Each polygon in set C is also considered to be a candidate source polygon for a GU. Each polygon can be assigned to exactly one source polygon. The barrier aware drive time between polygon i and polygon j would contribute to total cost. The volume assigned to each GU must respect maximum volume capacity (max_capacity) and minimum volume capacity (min_capacity). Set SH defines polygon-polygon pairs which have a driving time outside of the maximum allowed time—the model is constrained from assigning these pairs. The average daily volume of polygon i is $demand_i$. The penalty for opening a new GU is $penalty_{new\_GU}$. Binary location variable $x_{ij}=1$ if polygon i is assigned to a GU with source node j. It should be noted that $x_{ij}=1$ if polygon j is a source node for a GU. The following formula is implemented by the geographical unit assignment engine of the service provider computers to generate the geographical units for a geographical area:

$$\text{minimize} \sum_{i \in C, j \in C} \text{demand}_i * \text{drive}_{time_{ij}} * x_{ij} + \text{penalty}_{newRGU} * \sum_{j \in C} x_{jj}$$

Subject to constraints:

$\sum_{j \in C} x_{ij}=1$, for $i \in C$ (1)

$x_{ij} \leq x_{jj}$, for $i \in C, j \in C$ (2)

$\sum_{j \in C} x_{jj} \leq$ max facilities (3)

$\sum_{i \in C} \text{demand}_i * x_{ij} \leq \text{max\_capacity} * x_{jj}$, for $j \in C$ (4)

$\sum_{i \in C} \text{demand}_i * x_{ij} \geq \text{min\_capacity} * x_{jj}$, for $j \in C$ (5)

$x_{ij}=0$, for $(i,j) \in SH$ (6)

$x_{ij} \in \{0,1\}$

Where constraint (1) enforces that every polygon is assigned to exactly one source polygon; constraint (2) ensures that polygons may only be assigned to source polygons that are open; constraint (3) ensures that the number of GUs is less than or equal to the maximum number of GUs; constraints (4) and (5) enforces that each GU assigned to the geographical area meets delivery volume targets lower than the maximum capacity delivery volume targets and higher than the minimum capacity delivery volume targets; and constraint (6) ensures that a polygon cannot be assigned to a source polygon if the drive time between them is above the maximum drive time threshold. In embodiments, the constraints can be specified by a delivery entity or an administrator associated with the service provider computers implementing the geographical unit generation features. It should be noted that the geographical unit assignment engine implemented by the service provider computers may assign GUs which cross barriers when necessary to meet the capacity threshold or to meet the maximum GU constraint.

Figure 7A:
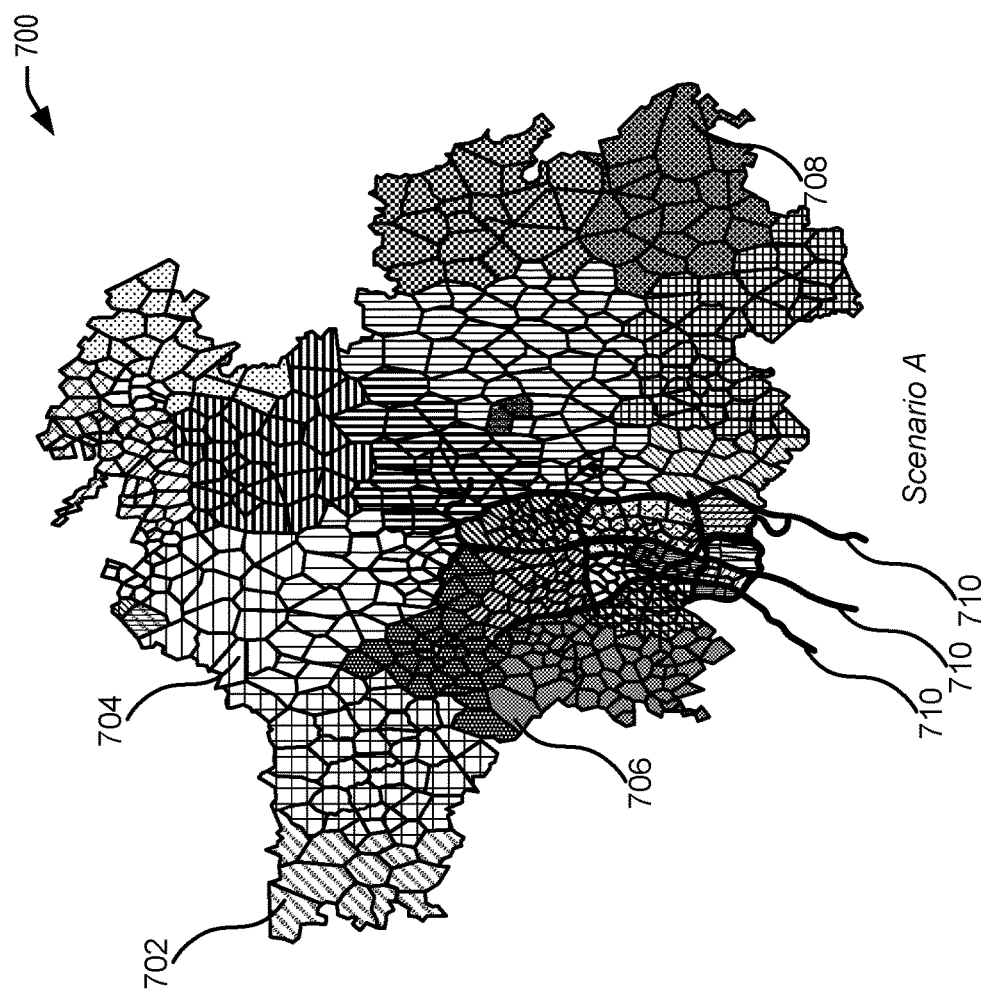
FIG. 7A illustrates an example of geographical units assigned to a geographical area given a first set of constraints using the geographical unit generation feature, in accordance with at least one embodiment.
Figure 7B:
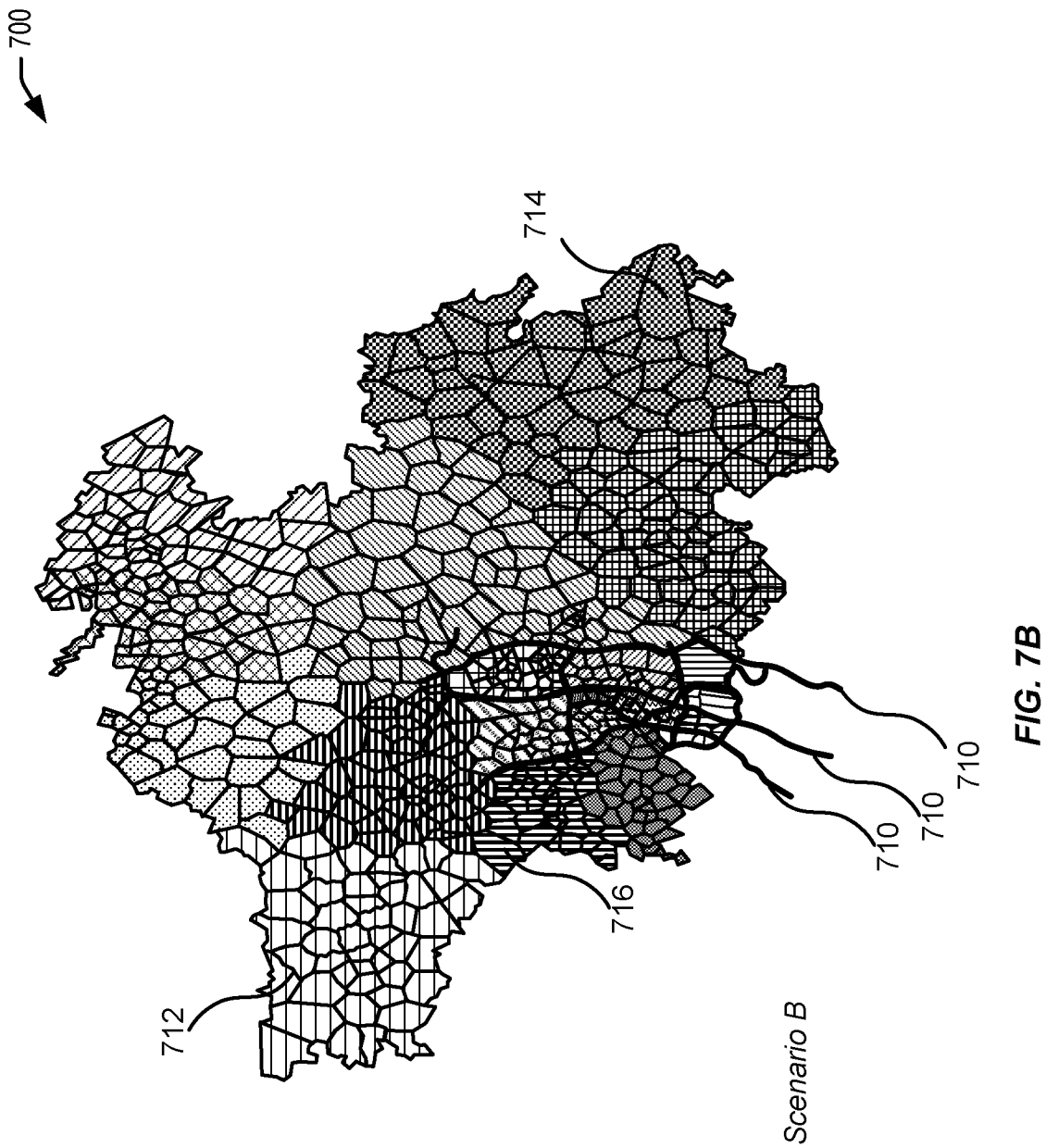
FIG. 7B illustrates an example of geographical units assigned to a geographical area given a second set of constraints using the geographical unit generation feature, in accordance with at least one embodiment.
Figure 7C:
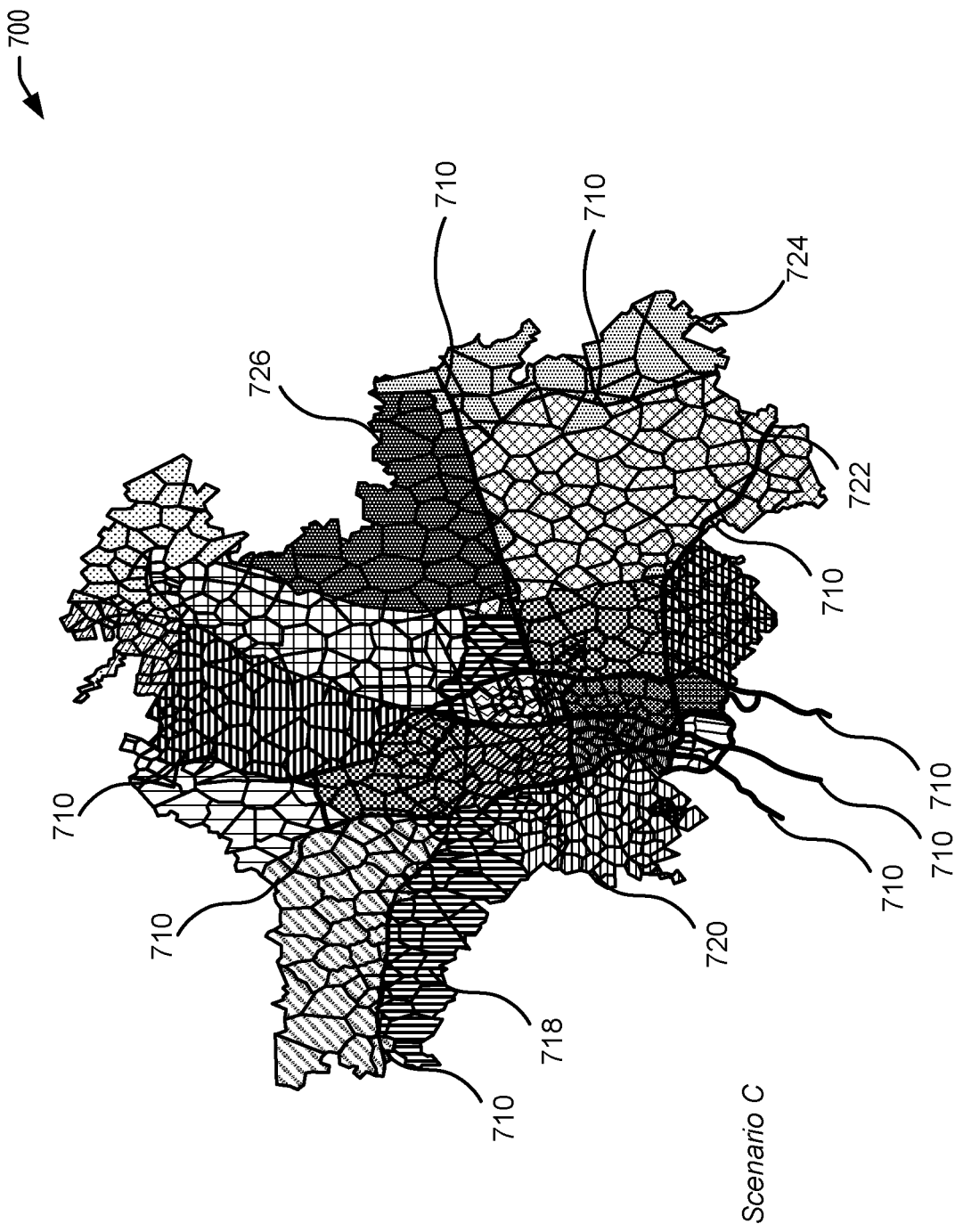
FIG. 7C illustrates an example of geographical units assigned to a geographical area given a third set of constraints using the geographical unit generation feature, in accordance with at least one embodiment.

FIGS. 7A-7C illustrate examples of geographical units assigned to a geographical area 700 given different defined parameters and constraints using the geographical unit generation feature, in accordance embodiments disclosed herein. FIG. 7A depicts several geographical units 702-708 assigned to geographical area 700 and barriers 710. The geographical units 702-708 assigned to geographical area 700 reflect a constraint which indicates a higher number of GUs than the geographical units 712-716 assigned to geographical area 700 depicted in FIG. 7B. For example, the constraint may differ in the depiction of the geographical units assigned to the geographical area 700 depicted in FIG. 7B as the constraint may indicate that a lower number of GUs is required. In scenarios, such as Scenario A of FIG. 7A utilizing a constraint that indicates that a higher number of GUs can be utilized each GU (702-708) may include a lower number of delivery volume than Scenario B depicted in FIG. 7B.

For example, as depicted in FIG. 7B, the geographical area 700 has been assigned less GUs (712-716) overall than in Scenario A depicted in FIG. 7A. As such, each GU (e.g., 712-716) of FIG. 7B would have a higher number of delivery volume than the GUs (e.g., 702-708) of FIG. 7A.

Scenario C depicted in FIG. 7C represents specifying of constraints to include more objects as barriers resulting in a suboptimal number of GUs 718-726. Delivery routes generated using the GUs 718-726 for geographical area 700 would be inefficient as more barriers would need to be crossed and delivery associates may need to travel between GUs 718-726 to reach delivery locations. Using inefficient delivery routes may lead to decreased affinity for an area for delivery associates and thus increased delivery time to complete a task of delivering an item to a delivery location. It should be noted that in FIGS. 6-7C the uniqueness of each GU is represented through different hatching applied to the polygon that represents the GU for the geographical area.

Figure 8:
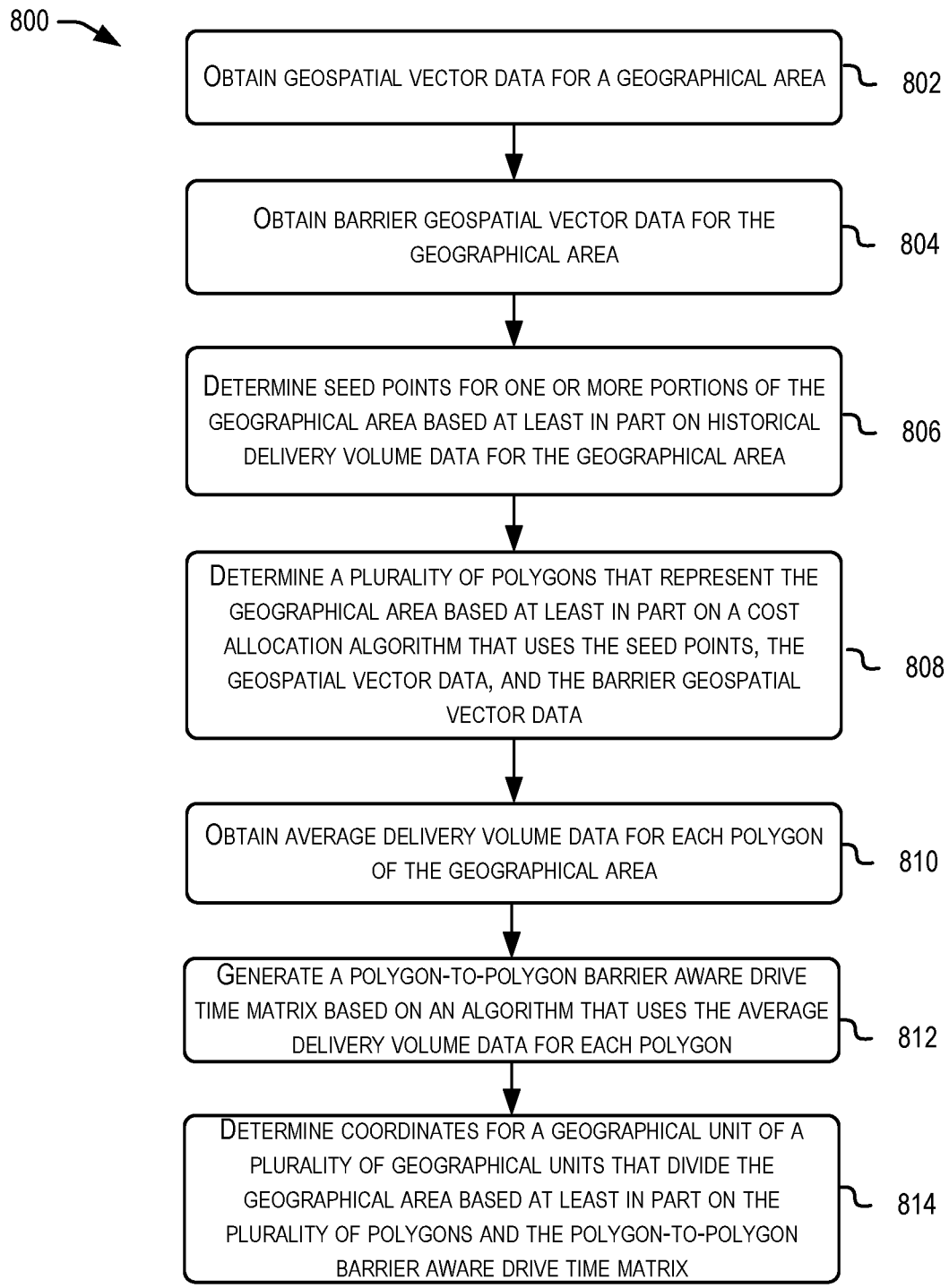
FIG. 8 illustrates an example flow diagram for a geographical unit generation feature, in accordance with at least one embodiment.
Figure 9:
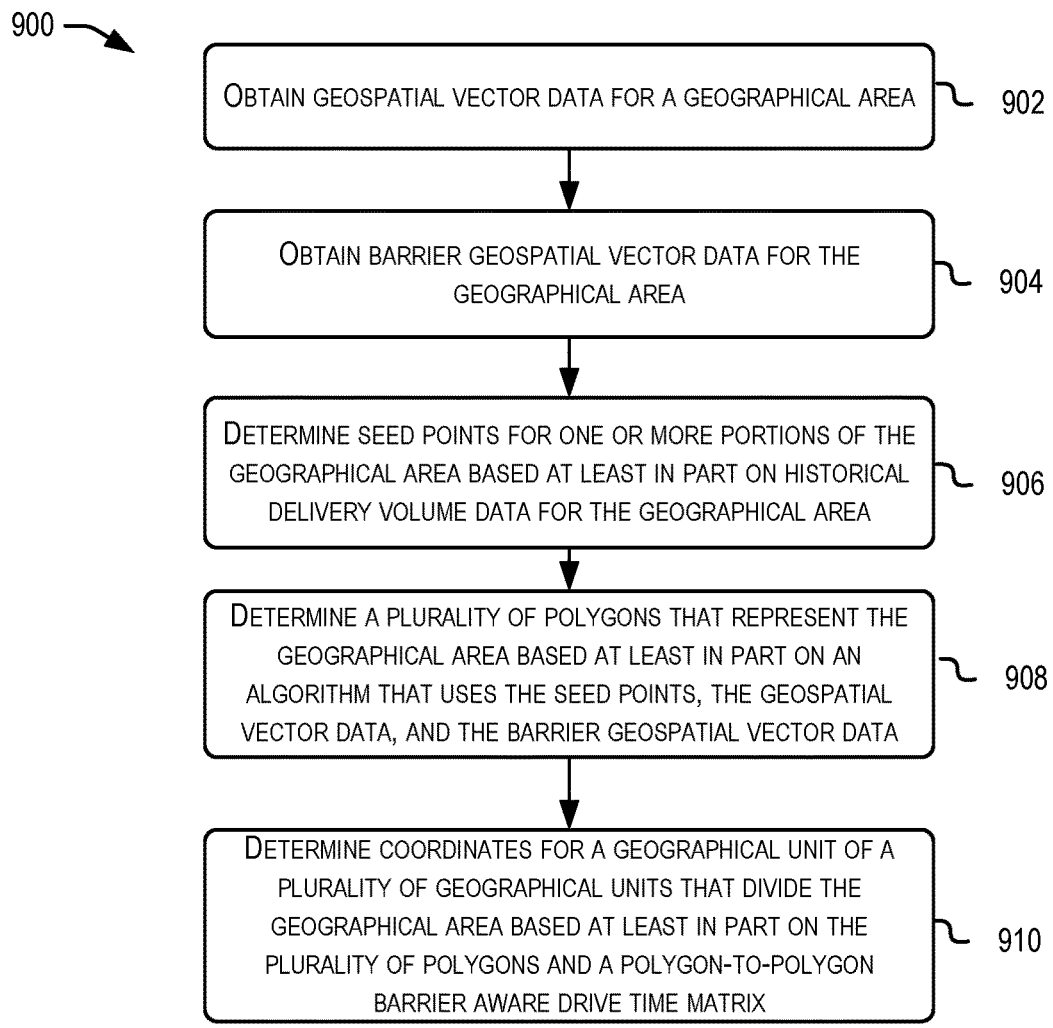
FIG. 9 illustrates an example flow diagram for a geographical unit generation feature, in accordance with at least one embodiment.

FIGS. 8 and 9 illustrate example flow charts for geographical unit generation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
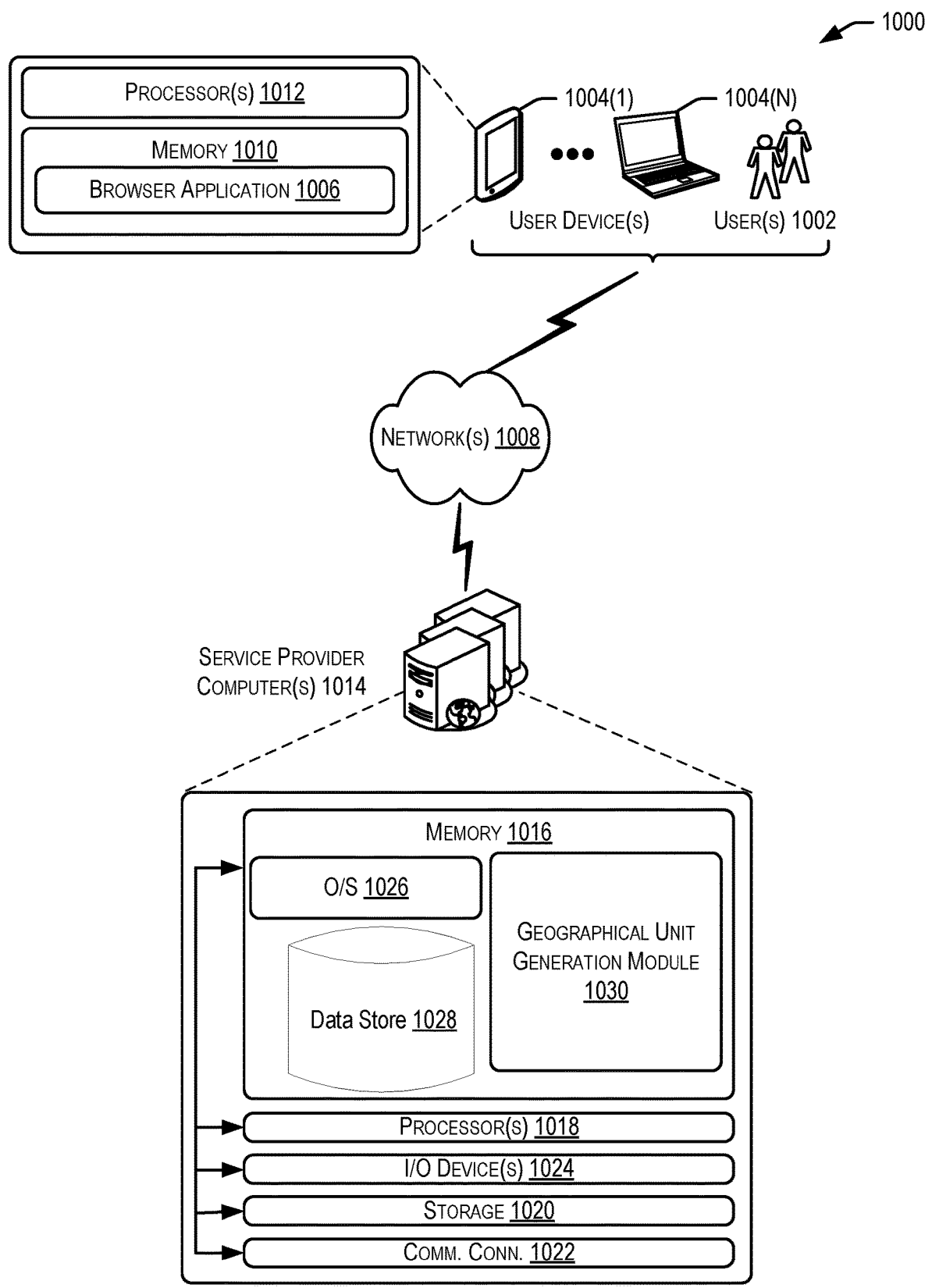
FIG. 10 illustrates an example architecture for implementing a geographical unit generation feature, in accordance with at least one embodiment.

In some examples, the service provider computers (service provider computers 1014) utilizing at least the geographical unit generation module 1030 depicted in FIG. 10 may perform the processes 800 and 900 of FIGS. 8 and 9. In FIG. 8, the process 800 may include obtaining geospatial vector data for a geographical area at 802. In embodiments, the geospatial vector data may be stored in a Shapefile. The service provider computers implementing the geographical unit generation feature may modify the Shapefile to generate the polygons which will be assigned to geographical units. The process 800 may include obtaining barrier geospatial vector data for the geographical area at 804. In embodiments, the barrier geospatial vector data may include information that identifies barriers such as rivers, lakes, major highways, or other obstructions for the geographical area. The geographical area may include a set of geographical coordinates that encompass an area such as postal codes, neighborhoods, census tracts, or ZIP code tabulation areas. The process 800 may include determining seed points for one or more portions of the geographical area based at least in part on historical delivery volume data for the geographical area at 806. In embodiments, the seed points may represent delivery volume density for the portion based at least in part on the historical delivery volume data. In accordance with at least one embodiment, the seed points may be determined using a k-means clustering algorithm that uses the historical delivery volume data for the geographical area or other suitable algorithm for identifying seed points.

The process 800 may include determining a plurality of polygons that represent the geographical area based at least in part on a cost allocation algorithm that uses the seed points, the geospatial vector data, and the barrier geospatial vector data at 808. In embodiments, the polygons may be barrier aware polygons. The polygons may be Voronoi polygons. In accordance with at least one embodiment, the algorithm may be a raster-based cost allocation algorithm where the cost allocation process determines the least cost to and from each cell in the raster to the nearest seed point, and allocates each cell to the nearest seed point. The process 800 may include obtaining average delivery volume data for each polygon of the geographical area at 810. In embodiments, the historical delivery volume data and the average delivery volume data may be received from a third party such as a delivery entity or customer of the service provided by the service provider computers implementing the geographical unit generation feature described herein. The process 800 may include generating a polygon-to-polygon barrier aware drive time matrix based at least in part on an algorithm that uses the average delivery volume data for each polygon at 812. In embodiments, the polygon-to-polygon barrier aware drive time matrix identifies a calculated cost for traveling from one polygon to another polygon given a constraint of a barrier identified in the barrier geospatial vector data. For example, a source node of the drive time matrix will follow the least cost path of adjacent nodes to reach a target node and penalize a pair of nodes that require traveling through a barrier. The process 800 may include determining coordinates for a geographical unit of a plurality of geographical units that divide the geographical area based at least in part on the plurality of polygons and the polygon-to-polygon barrier aware drive time matrix at 814. In embodiments, the geographical units may be used to generate delivery routes and delivery route sequences for delivering items from a delivery station to delivery locations within the geographical area. The delivery routes may be generated such that a delivery route does not cross a boundary that defines one geographical unit from another geographical unit.

The process 900 of FIG. 9 may include obtaining geospatial vector data for a geographical area at 902. The process 900 of FIG. 9 may include obtaining barrier geospatial vector data for the geographical area at 904. The process 900 of FIG. 9 may include determining seed points for one or more portions of the geographical area based at least in part on historical delivery volume data for the geographical area at 906. In embodiments, the process 900 may include determining a plurality of polygons that represent the geographical area based at least in part on an algorithm that uses the seed points, the geospatial vector data, and the barrier geospatial vector data at 908. The process 900 may include determining coordinates for a geographical unit of a plurality of geographical units that divide the geographical area based at least in part on the plurality of polygons and a polygon-to-polygon barrier aware drive time matrix at 910. In embodiments, an entity associated with the service provider computers implementing the geographical unit generation feature may specify the seed points or third parties such as delivery entities may specify the seed points. In accordance with at least one embodiment, generating the polygon-to-polygon barrier aware drive time matrix includes identifying a population weighted centroid for each polygon of the plurality of polygons. The service provider computers implementing the geographical unit generation feature may identify and correct invalid geometries between polygons of the plurality of polygons prior to generating the polygon-to-polygon barrier aware drive time matrix.

FIG. 10 illustrates an example architecture for implementing a geographical unit generation feature, in accordance with at least one embodiment. In architecture 1000, one or more users 1002 (e.g., delivery associates, users, consumers, etc.) may utilize user computing devices 1004(1)-(N) (collectively, user devices 1004) to access a browser application 1006 or a user interface (UI) accessible through the browser application 1006, via one or more networks 1008 to receive a delivery route for a geographical area based at least in part on a geographical unit, or receive a representation of the geographical area divided into geographical units. The "browser application" 1006 can be any browser control or native application that can access and display a network page or other information such as a user interface of a native software application for enabling the presentation of a delivery route, representation of geographic units for an area, or to provide historical and/or average delivery volume data. A native software application may include an application or program that has been developed for use on a particular platform (such as an operating system) or a particular device (such as a particular type of mobile device or user device 1004). In embodiments, the user device 1004 may include one or more components for enabling the user 1002 to interact with the browser application 1006.

The user devices 1004 may include at least one memory 1010 and one or more processing units or processor(s) 1012. The memory 1010 may store program instructions that are loadable and executable on the processor(s) 1012, as well as data generated during the execution of these programs. Depending on the configuration and type of the user devices 1004, the memory 1010 may be volatile (such as random access memory (RAM)) and/or non-volatile (such as read-only memory (ROM), flash memory, etc.). The user devices 1004 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1004. In some implementations, the memory 1010 may include multiple different types of memory, such as static random access memory (SRAM), dynamic random access memory (DRAM), or ROM.

Turning to the contents of the memory 1010 in more detail, the memory 1010 may include an operating system and one or more application programs or services for implementing the features disclosed herein. Additionally, the memory 1010 may include one or more modules for implementing the features described herein including a geographical unit generation module 1030.

The architecture 1000 may also include one or more service provider computers 1014 that may, in some examples, provide computing resources such as, but not limited to, client entities, low latency data storage, durable data store, data access, management, virtualization, hosted computing environment or "cloud-based" solutions, gravitational route feature implementation, etc. The service provider computers 1014 may implement or be an example of the service provider computer(s) described herein with reference to FIGS. 1-9 and throughout the disclosure. The one or more service provider computers 1014 may also be operable to provide site hosting, computer application development, and/or implementation platforms, combinations of the foregoing, or the like to the one or more users 1002 via user devices 1004.

In some examples, the networks 1008 may include any one or a combination of many different types of networks, such as cable networks, the Internet, wireless networks, cellular networks, and other private and/or public networks. While the illustrated examples represents the users 1002 communicating with the service provider computers 1014 over the networks 1008, the described techniques may equally apply in instances where the users 1002 interact with the one or more service provider computers 1014 via the one or more user devices 1004 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1014 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1014 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1014 may be in communication with the user device 1004 via the networks 1008, or via other network connections. The one or more service provider computers 1014 may include one or more servers, perhaps arranged in a cluster or as individual servers not associated with one another. In embodiments, the service provider computers 1014 may be in communication with one or more third party computers (not pictured) via networks 1008 to receive or otherwise obtain data including previous delivery routes, previous delivery locations, a type of delivery location, previous geographical units for a geographical area, historical delivery volume data, average delivery volume data, or other suitable information for generating geographical units that divide a geographical area or delivery routes generated from the geographical units for the geographical area as described herein.

In one illustrative configuration, the one or more service provider computers 1014 may include at least one memory 1016 and one or more processing units or processor(s) 1018. The processor(s) 1018 may be implemented as appropriate in hardware, computer-executable instructions, firmware, or combination thereof. Computer-executable instruction or firmware implementations of the processor(s) 1018 may include computer-executable or machine-executable instructions written in any suitable programming language to perform the various functions described when executed by a hardware computing device, such as a processor. The memory 1016 may store program instructions that are loadable and executable on the processor(s) 1018, as well as data generated during the execution of these programs. Depending on the configuration and type of the one or more service provider computers 1014, the memory 1016 may be volatile (such as RAM) and/or non-volatile (such as ROM, flash memory, etc.). The one or more service provider computers 1014 or servers may also include additional storage 1020, which may include removable storage and/or non-removable storage. The additional storage 1020 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1016 may include multiple different types of memory, such as SRAM, DRAM, or ROM.

The memory 1016, the additional storage 1020, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1016 and the additional storage 1020 are all examples of non-transitory computer storage media. Additional types of non-transitory computer storage media that may be present in the one or more service provider computers 1014 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1014. Combinations of any of the above should also be included within the scope of non-transitory computer-readable media.

The one or more service provider computers 1014 may also contain communication connection interface(s) 1022 that allow the one or more service provider computers 1014 to communicate with a data store, another computing device or server, user terminals, and/or other devices on the networks 1008. The one or more service provider computers 1014 may also include I/O device(s) 1024, such as a keyboard, a mouse, a pen, a voice input device, a touch input device, a display, speakers, a printer, etc.

Turning to the contents of the memory 1016 in more detail, the memory 1016 may include an operating system 1026, one or more data stores 1028, and/or one or more application programs or services for implementing the features disclosed herein including the geographical unit generation module 1030. In accordance with at least one embodiment, the geographical unit generation module 1030 may be configured to receive or obtain geospatial vector data and barrier geospatial vector data for a geographic area. In embodiments, the geospatial vector data and barrier geospatial vector data may be stored and transmitted as Shapefiles. The barrier geospatial vector data may be extracted from a Shapefile for a geographical area. In embodiments, the geographical unit generation module 1030 may be configured to use a k-means clustering algorithm to determine a plurality of seed points for one or more portions of the geographical area using historical delivery volume data for the geographical area. In embodiments, the service provider computers 1014 may receive the historical delivery volume data for a geographical area from a third party computer (not pictured). In accordance with at least one embodiment, the geographical unit generation module 1030 may be configured to determine a plurality of polygons that represent the geographical area and implementing a raster-based cost allocation algorithm that uses the seed points, the geospatial vector data, and the barrier geospatial vector data. The polygons may be barrier aware polygons. The geographical unit generation module 1030 may be configured to implement a Floyd-Warshall algorithm to generate a polygon-to-polygon barrier aware drive time matrix. The geographical unit generation module 1030 may be configured to determine coordinates for a geographical unit of a plurality of geographical units that divide the geographical area based at least in part on the plurality of polygons and the a polygon-to-polygon barrier aware drive time matrix. The geographical unit generation module 1030 may be configured to implement an algorithm that has one or more constraints for generating the geographical units for the geographical area. Entities associated with the service provider computers 1014 or delivery entities may specify the constraints. The geographical unit generation module 1030 may be configured to generate and transmit delivery routes for a geographic unit of a geographic area to one or more delivery associates who are delivering the packages on a given day. The service provider computer 1014 may transmit the delivery routes to the user devices 1004 of users 1002 (delivery associates or delivery entities) via networks 1008.

Figure 11:
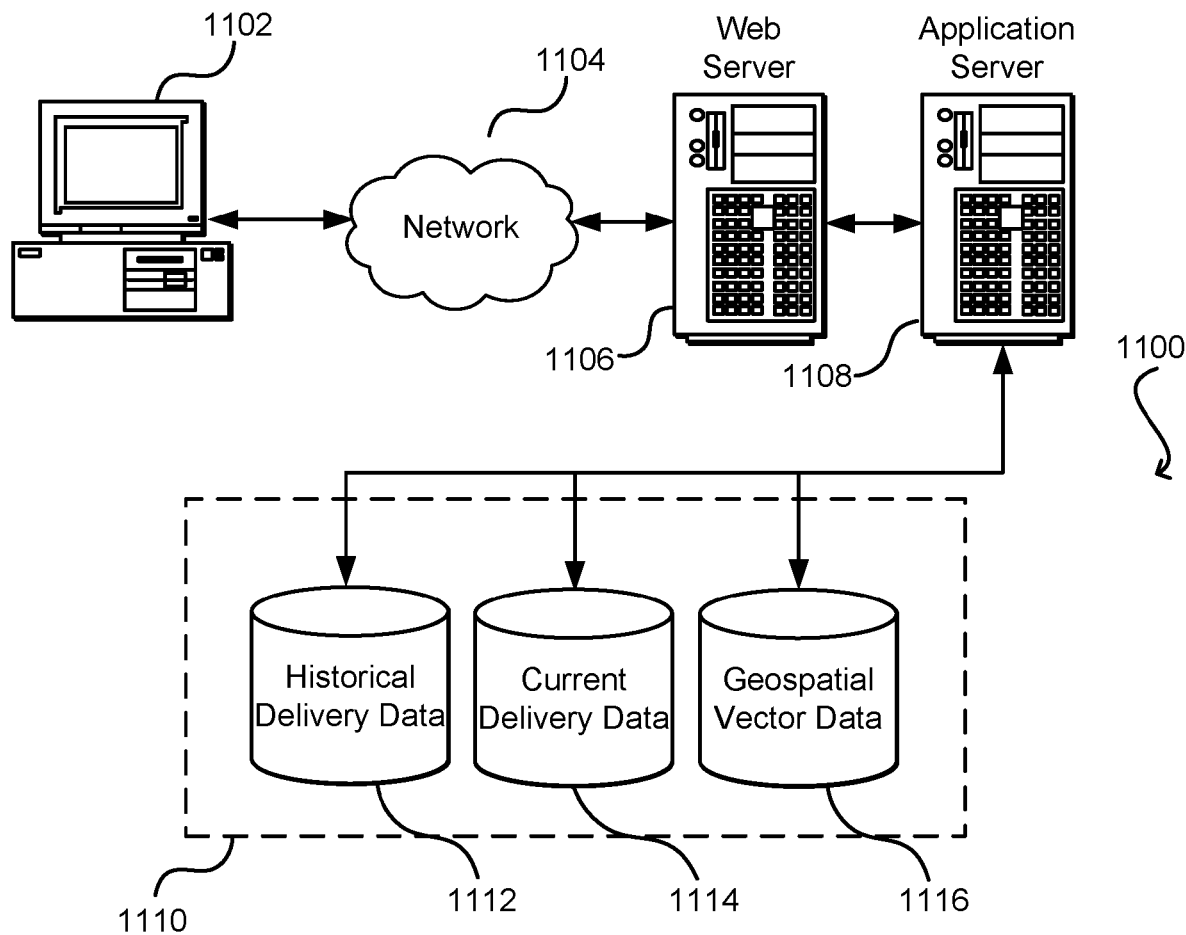
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing historical delivery data 1112 and geospatial vector data 1116, which can be used to serve content for the production side including generating seed points for use in determining polygons that represent a geographical area. The data store also is shown to include a mechanism for storing current delivery data 1114, which can be used for reporting, analysis, or other such purposes such as generating a polygon-to-polygon barrier aware drive time matrix that includes information which identifies a calculated cost for traveling from one polygon to another polygon of the area given a constraint of a barrier identified in the geospatial vector data. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computer system, geospatial vector data for a geographical area;
   obtaining, by the computer system, barrier geospatial vector data for the geographical area, the barrier geospatial vector data identifying barriers, represented as shapes, that include highways, lakes, or mountains for the geographical area;
   determining, by the computer system, seed points for one or more portions of the geographical area based at least in part on implementing a k-means clustering algorithm that uses historical delivery volume data for the geographical area;
   determining, by the computer system, a plurality of polygons that represent the geographical area based at least in part on a cost allocation algorithm that uses the seed points, the geospatial vector data, and the barrier geospatial vector data, a polygon of the plurality of polygons including a barrier aware polygon, each of the polygons containing one seed point, and each point in a particular polygon being closer to the seed point of the particular polygon than to any other seed point;
   obtaining, by the computer system, average delivery volume data for each polygon of the plurality of polygons for the geographical area;
   generating, by the computer system, a polygon-to-polygon barrier aware drive time matrix based at least in part on an algorithm that uses the average delivery volume data for each polygon, the polygon-to-polygon barrier aware drive time matrix including information that identifies a calculated cost for traveling from one polygon to another polygon of the plurality of polygons given a constraint of a barrier identified in the barrier geospatial vector data; and
   determining, by the computer system, coordinates for at least one geographical unit of a plurality of geographical units that divide the geographical area based at least in part on the plurality of polygons and the polygon-to-polygon barrier aware drive time matrix.

2. The computer-implemented method of claim 1, wherein determining the coordinates for the at least one geographical unit of the plurality of geographical units that comprise the geographical area is based at least in part at least one of identifying a change in the coordinates for the geographical area, updated average delivery volume data, or presence of a new delivery station.

3. The computer-implemented method of claim 1, further comprising:
   generating, by the computer system, updated delivery routes based at least in part on the coordinates for the at least one geographical unit; and
   transmitting, by the computer system and to user devices of delivery entities, the updated delivery routes.

4. The computer-implemented method of claim 1, wherein the geospatial vector data for the geographical area is stored in a first Shapefile and the barrier geospatial vector data for the geographical area is stored in a second Shapefile.

5. The computer-implemented method of claim 4, wherein determining the plurality of polygons includes generating, by the computer system, a third Shapefile to store the plurality of polygons.

6. The computer-implemented method of claim 5, further comprising modifying, by the computer system, third Shapefile to include a buffer space around identified barriers included in the barrier geospatial vector data for the geographical area.

7. The computer-implemented method of claim 1, wherein the calculated cost for traveling from one polygon to another polygon of the plurality of polygons given the constraint of the barrier is based at least in part on a Floyd-Warshall algorithm.

8. A non-transitory computer-readable storage medium storing computer-executable instructions that, when executed by a computer system, configure the computer system to perform operations comprising:
   obtaining geospatial vector data for a geographical area;
   obtaining barrier geospatial vector data for the geographical area, the barrier geospatial vector data identifying barriers, represented as shapes, that include highways, lakes, or mountains for the geographical area;
   determining seed points for one or more portions of the geographical area based at least in part on implementing a k-means clustering algorithm that uses historical volume data for the geographical area;

determining a plurality of polygons that represent the geographical area based at least in part on an algorithm that uses the seed points, the geospatial vector data, and the barrier geospatial vector data, a polygon of the plurality of polygons including a barrier aware polygon, each of the polygons containing one seed point, and each point in a particular polygon being closer to the seed point of the particular polygon than to any other seed point; and determining coordinates for a geographical unit of a plurality of geographical units that divide the geographical area based at least in part on the plurality of polygons and a polygon-to-polygon barrier aware drive time matrix that identifies a calculated cost for traveling from one polygon to another polygon of the plurality of polygons using barriers identified in the barrier geospatial vector data for the geographical area.

9. The non-transitory computer-readable storage medium of claim 8, wherein determining the seed points is based at least in part on input from a delivery entity.

10. The non-transitory computer-readable storage medium of claim 8, wherein the geographical area is represented by postal codes, neighborhoods, census tracts, or ZIP code tabulation areas.

11. The non-transitory computer-readable storage medium of claim 8, wherein the instructions, when executed by the computer system, further configure the computer system to perform operations comprising generating the polygon-to-polygon barrier aware drive time matrix based at least in part on identifying a population weighted centroid for each polygon of the plurality of polygons.

12. The non-transitory computer-readable storage medium of claim 8, wherein determining the plurality of polygons that represent the geographical area includes identifying and correcting invalid geometries between polygons of the plurality of polygons.

13. A computer system comprising:
a memory configured to store computer-executable instructions; and
a processor in communication with the memory configured to execute the computer-executable instructions to at least:
obtain geospatial vector data for a geographical area;
obtain barrier geospatial vector data for the geographical area, the barrier geospatial vector data identifying barriers, represented as shapes, that include highways, lakes, or mountains for the geographical area;
determine seed points for one or more portions of the geographical area based at least in part on implementing a k-means clustering algorithm that uses historical delivery volume data for the geographical area;
determine a plurality of polygons that represent the geographical area based at least in part on an algorithm that uses the seed points, the geospatial vector data, and the barrier geospatial vector data, each of the polygons containing one seed point, and each point in a particular polygon being closer to the seed point of the particular polygon than to any other seed point; and
determine coordinates for a geographical unit of a plurality of geographical units that divide the geographical area based at least in part on the plurality of polygons and information that identifies a calculated cost for traveling from one polygon to another polygon of the plurality of polygons using barrier identified in the barrier geospatial vector data for the geographical area.

14. The computer system of claim 13, wherein the processor in communication with the memory is further configured to execute the computer-executable instructions to at least implement a geographical unit assignment engine that uses the plurality of polygons and average delivery volume data for each polygon to determine the coordinates.

15. The computer system of claim 14, wherein the geographical unit assignment engine also utilizes constraints including a first number of geographical units that can be assigned for the geographical area and a second number of delivery volume for each geographical unit of the plurality of geographical units.

16. The computer system of claim 15, wherein the first number of the geographical units and the second number of the delivery volume are specified by an entity.

17. The computer system of claim 13, wherein the historical delivery volume data for the geographical area is provided by a delivery entity.

18. The computer system of claim 17, wherein the processor in communication with the memory is further configured to execute the computer-executable instructions to at least: generate delivery routes for the delivery entity using the coordinates for the plurality of geographical units that divide the geographical area.

19. The computer system of claim 18, wherein the delivery routes do not cross from one geographical unit to another geographical unit of the plurality of geographical units of the geographical area.

20. The computer-implemented method of claim 1, wherein the barrier aware polygon comprises a polygon that does not cross the barrier geospatial vector data.

* * * * *